United States Patent
Xu et al.

(10) Patent No.: US 12,021,786 B2
(45) Date of Patent: Jun. 25, 2024

(54) ELECTRONIC DEVICE, WIRELESS COMMUNICATION METHOD, AND COMPUTER-READABLE MEDIUM

(71) Applicant: Sony Group Corporation, Tokyo (JP)

(72) Inventors: Wei Xu, Jiangsu (CN); Yuyao Sun, Jiangsu (CN); Xin Guo, Beijing (CN); Chen Sun, Beijing (CN)

(73) Assignee: SONY GROUP CORPORATION, Tokyo (JP)

(*) Notice: Subject to any disclaimer, the term of this patent is extended or adjusted under 35 U.S.C. 154(b) by 403 days.

(21) Appl. No.: 17/427,669

(22) PCT Filed: Mar. 6, 2020

(86) PCT No.: PCT/CN2020/078191
§ 371 (c)(1),
(2) Date: Aug. 2, 2021

(87) PCT Pub. No.: WO2020/182074
PCT Pub. Date: Sep. 17, 2020

(65) Prior Publication Data
US 2022/0131675 A1    Apr. 28, 2022

(30) Foreign Application Priority Data
Mar. 13, 2019  (CN) .......................... 201910189127.5

(51) Int. Cl.
*H04L 5/00*          (2006.01)
*H04B 17/382*     (2015.01)
(Continued)

(52) U.S. Cl.
CPC ......... *H04L 5/0055* (2013.01); *H04B 17/382* (2015.01); *H04L 1/1607* (2013.01);
(Continued)

(58) Field of Classification Search
CPC ..... H04L 47/10; H04L 47/2441; H04L 47/30; H04L 47/32; H04L 12/5693;
(Continued)

(56) References Cited

U.S. PATENT DOCUMENTS 9,161,288 B2 * 10/2015  Cho .................... H04W 40/02
2012/0275395 A1 * 11/2012  Gerstenberger ...... H04L 5/0055
                                                                 370/329
(Continued)

FOREIGN PATENT DOCUMENTS

WO        2016/117875 A1     7/2016
WO    WO 2016/117875 A1 *   7/2016 ........... H04L 5/0035
(Continued)

OTHER PUBLICATIONS

International Search Report and Written Opinion dated Jun. 4, 2020, received for PCT Application PCT/CN2020/078191, Filed on Mar. 6, 2020, 8 pages including English Translation.

*Primary Examiner* — Peter G Solinsky
*Assistant Examiner* — Sanjay K Dewan
(74) *Attorney, Agent, or Firm* — XSENSUS LLP

(57) ABSTRACT

The present disclosure relates to an electronic device, a wireless communication method, and a computer-readable medium. The electronic device for wireless communication according to one embodiment comprises a processing circuit. The processing circuit is configured to obtain a set of collaborative devices of a target device, the set of collaborative devices comprising one or more collaborative devices. The processing circuit is further configured to control to send data for the target device to the target device and at least one collaborative device so that the at least one collaborative device forwards the data to the target device.

7 Claims, 15 Drawing Sheets

(51) Int. Cl.
*H04L 1/16* (2023.01)
*H04L 1/1607* (2023.01)
*H04L 1/18* (2023.01)
*H04L 9/40* (2022.01)
*H04L 69/22* (2022.01)
*H04W 40/22* (2009.01)

(52) U.S. Cl.
CPC .............. *H04L 1/18* (2013.01); *H04L 5/0007* (2013.01); *H04L 9/40* (2022.05); *H04L 69/22* (2013.01); *H04W 40/22* (2013.01)

(58) Field of Classification Search
CPC ....... H04L 5/0055; H04L 9/40; H04L 1/1607; H04L 1/18; H04L 5/0007; H04L 69/22; H04L 29/06; H04B 17/382; H04W 40/22
USPC ........................................................ 370/235
See application file for complete search history.

(56) References Cited

U.S. PATENT DOCUMENTS

2014/0112249 A1    4/2014  Cho
2016/0219578 A1*   7/2016  Lim ..................... H04B 7/026

FOREIGN PATENT DOCUMENTS

WO       2018/077377 A1      5/2018
WO    WO 2018/077377 A1 *   5/2018   ........... H04L 5/0001
WO       2018/182590 A1     10/2018
WO    WO 2018182590 A1 *   10/2018   ............. H04B 7/026

* cited by examiner

ELECTRONIC DEVICE, WIRELESS COMMUNICATION METHOD, AND COMPUTER-READABLE MEDIUM

CROSS-REFERENCE TO RELATED APPLICATIONS

The present application is based on PCT filing PCT/CN2020/078191, filed Mar. 6, 2020, which claims priority to Chinese Patent Application No. 201910189127.5, titled "ELECTRONIC DEVICE, WIRELESS COMMUNICATION METHOD, AND COMPUTER-READABLE MEDIUM", filed on Mar. 13, 2019 with the Chinese Patent Office, each of which is incorporated herein by reference in its entirety.

FIELD

The present disclosure generally relates to the field of wireless communication, and in particular to an electronic device for wireless communication, a wireless communication method and a computer readable medium.

BACKGROUND

In application scenarios that have a high requirement regarding a delay, such as factory automation, remote driving and other application scenarios, the delay may be at a level of less than 10 microseconds. In addition, some applications require high reliability, such as Ultra-Reliable Low Latency Communication (URLLC). In these application scenarios, in order to meet the reliability requirement, the number of retransmissions may be increased.

SUMMARY

In the following, an overview of the present disclosure is given simply to provide basic understanding to some aspects of the present disclosure. It should be understood that this overview is not an exhaustive overview of the present disclosure. It is neither intended to determine a critical part or an important part of the present disclosure, nor to limit the scope of the present disclosure. An object of the overview is only to give some concepts in a simplified manner, which serves as a preface of a more detailed description described later.

An electronic device for wireless communication is provided according to an embodiment. The electronic device includes processing circuitry. The processing circuitry is configured to obtain a collaborative equipment set of target equipment, the collaborative equipment set including one or more collaborative equipment. The processing circuitry is further configured to perform control to transmit data for the target equipment jointly to the target equipment and at least one collaborative equipment, for the at least one collaborative equipment to forward the data to the target equipment.

According to another embodiment, a wireless communication method includes a step of obtaining a collaborative equipment set of target equipment, the collaborative equipment set including one or more collaborative equipment. The method further includes a step of transmitting data for the target equipment jointly to the target equipment and at least one collaborative equipment, for the at least one collaborative equipment to forward the data to the target equipment.

An electronic device for wireless communication is provided according to another embodiment. The electronic device includes processing circuitry. The processing circuitry is configured to perform control to receive data transmission from a wireless access point, the data transmission containing identification information of target equipment and data for the target equipment. The processing circuitry is further configured to perform control to forward the data to the target equipment, in a case where it is determined based on the identification information that current equipment is not the target equipment.

According to another embodiment, a wireless communication method includes a step of receiving data transmission from a wireless access point, the data transmission containing identification information of target equipment and data for the target equipment. The method further includes a step of forwarding the data to the target equipment, in a case where it is determined based on the identification information that current equipment is not the target equipment.

An electronic device for wireless communication is provided according to another embodiment. The electronic device includes processing circuitry. The processing circuitry is configured to perform control to receive data transmission from a wireless access point, the data transmission containing identification information of target equipment and data for the target equipment. The processing circuitry is further configured to perform control to receive the data from the wireless access point that is forwarded by at least one collaborative equipment, in a case where it is determined based on the identification information that current equipment is the target equipment.

According to another embodiment, a wireless communication method includes a step of receiving data transmission from a wireless access point, the data transmission containing identification information of target equipment and data for the target equipment. The method further includes a step of receiving the data from the wireless access point that is forwarded by at least one collaborative equipment, in a case where it is determined based on the identification information that current equipment is the target equipment.

An electronic device for wireless communication is provided according to another embodiment. The electronic device includes processing circuitry. The processing circuitry is configured to perform control to receive data transmission from target equipment, the data transmission containing identification information of a wireless access point and data for the wireless access point. The processing circuitry is further configured to perform control to receive data from the target equipment that is forwarded by at least one collaborative equipment.

According to another embodiment, a wireless communication method includes a step of receiving data transmission from target equipment, the data transmission containing identification information of a wireless access point and data for the wireless access point. The method further includes a step of receiving the data from the target equipment that is forwarded by at least one collaborative equipment.

An electronic device for wireless communication is provided according to another embodiment. The electronic device includes processing circuitry. The processing circuitry is configured to perform control to receive data transmission from the target equipment, the data transmission containing identification information of a wireless access point and data for the wireless access point. The processing circuitry is further configured to perform control to forward the data to the wireless access point based on the identification information.

According to another embodiment, a wireless communication method includes a step of receiving data transmission from target equipment, the data transmission containing identification information of a wireless access point and data for the wireless access point. The method further includes a step of forwarding the data to the wireless access point based on the identification information.

An electronic device for wireless communication is provided according to another embodiment. The electronic device includes processing circuitry. The processing circuitry is configured to perform control to transmit data transmission to a wireless access point, the data transmission containing identification information of the wireless access point and data for the wireless access point. The processing circuitry is further configured to perform control to transmit the data to at least one collaborative equipment, for the at least one collaborative equipment to forward the data to the wireless access point.

According to another embodiment, a wireless communication method includes a step of transmitting data transmission to a wireless access point, the data transmission containing identification information of a wireless access point and data for the wireless access point. The method further includes a step of transmitting the data to at least one collaborative equipment, for the at least one collaborative equipment to forward the data to the wireless access point.

A computer readable medium is provided according to another embodiment. The computer readable medium includes executable instructions that, when executed by an information processing apparatus, cause the information processing apparatus to implement the above methods.

With the embodiments of the present disclosure, reliability of data transmission can be ensured while a transmission delay is reduced.

BRIEF DESCRIPTION OF THE DRAWINGS

The present disclosure may be better understood by referring to the detailed descriptions given below in conjunction with the drawings. Same or similar reference numerals are used to represent the same or similar components in the drawings. The drawings, together with the following detail descriptions, are included in the specification and form a part of the specification, to further exemplify preferred embodiments of the present disclosure and to explain principles and advantages of the present disclosure. In the drawings.

DETAILED DESCRIPTION OF EMBODIMENTS

Figure 1:
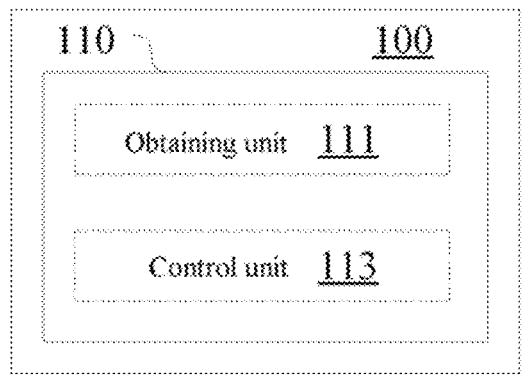
FIG. 1 is a block diagram showing a configuration example of an electronic device for wireless communication according to an embodiment of the present disclosure.

Embodiments of the present disclosure are described hereafter with reference to the drawings. An element and a feature that are described in a drawing or an embodiment of the present disclosure may be combined with an element and a feature that are shown in one or more other drawings or embodiments. It should be noted that, in order to clearly describe the embodiments, representations and descriptions of components and processes that are not related to the present disclosure and are known to those skilled in the art are omitted in the drawings and descriptions.

An example of configuration of an electronic device for wireless communication according to an embodiment of the present disclosure is illustrated below with reference to FIG. 1. As shown in FIG. 1, the electronic device 100 for wireless communication according to the embodiment includes processing circuitry 110. The processing circuitry 110, for example, may be implemented as a chip, a chipset, a central processing unit (CPU), or the like.

The electronic device according to the embodiment, for example, may be implemented on a transmitting and receiving point (TRP) side. The TRP is an access point capable of transmitting and receiving a wireless signal.

The processing circuitry 110 includes an obtaining unit 111 and a control unit 113. It should be noted that, although the obtaining unit 111 and the control unit 113 are shown as functional blocks in the drawing, it should be understood that functions of the units may be implemented by the processing circuitry as a whole, and are not necessarily implemented by discrete actual components in the processing circuitry. In addition, although the processing circuitry is shown by one block, the electronic device may include multiple processing circuitry. The functions of the units may be distributed onto the multiple processing circuitry, and thus the processing circuitry cooperate to perform the functions.

The obtaining unit 111 is configured to obtain a collaborative equipment report set of target equipment. The collaborative equipment set includes one or more collaborative equipment.

The control unit 113 is configured to perform control to transmit data for the target equipment jointly to the target equipment and at least one collaborative equipment, for the at least one collaborative equipment to forward the data to the target equipment.

Obtaining the collaborative equipment set may include determining the collaborative equipment set by the TRP. Alternatively, the collaborative equipment set may be determined by the target equipment and reported to the TRP.

It should be noted that regardless of whether the collaborative equipment set is determined by the TRP or the target equipment, the collaborative equipment set is determined specifically for the target equipment, so that the collaborative equipment set includes collaborative equipment suitable for forwarding data to the target equipment. In other words, the collaborative equipment set may vary depending on the target equipment.

The collaborative equipment set may be determined based on different conditions such as a spatial position and communication quality.

According to an embodiment, obtaining the collaborative equipment set may include determining the collaborative equipment set based on one or more items of the following information by the TRP: a nearby-equipment list of the target equipment; position information of the target equipment and other equipment; quality of communication of the target equipment and other equipment with a wireless access point; and quality of communication of the target equipment with other equipment.

More specifically, any equipment may measure channels between the equipment and the TRP and between the equipment and surrounding equipment and feed information back to the TRP. The feedback information of the equipment may include a nearby-equipment list (for example, the list may be generated through direct communication between equipment), position information of the equipment, and Signal to Interference plus Noise Ratio information between the equipment and the TRP. For example, the equipment may feedback the above information in a form of a periodic information report or an aperiodic information report.

Next, the TRP may establish a list of spatially-collaborative equipment sets based on a channel state. A method for determining the number of collaborative equipment in the spatially-collaborative equipment set may be determined comprehensively based on various conditions such as a reliability requirement of a system, the number of effective equipment in the system, a communication mode of the equipment, and a resource bandwidth of the system.

As an example, the list of spatially-collaborative equipment sets may be established in the following manners. The TRP allocates, based on position information of each equipment, one or more equipment that are close to the equipment for the equipment as collaborative equipment to form a spatially-collaborative equipment set of the equipment. Alternatively, the TRP allocates, based on Signal to Interference plus Noise Ratio information between each equipment and the TRP, one or more equipment that have a high Signal to Interference plus Noise Ratio for the equipment as collaborative equipment to form a spatially-collaborative equipment set of the equipment.

It should be noted that conditions for determining the collaborative equipment set are not limited to the above examples, and the conditions may be determined based on application scenarios and demands.

According to another embodiment, obtaining the collaborative equipment set may include receiving indication information on the collaborative equipment set from the target equipment. The collaborative equipment set is determined by the target equipment based on quality of communication between the target equipment and other equipment.

For example, each equipment may communicate with other equipment in a D2D transmission mode, and the equipment may select one or more equipment that have a high Signal to Interference plus Noise Ratio in the communication with the equipment to form its spatially-collaborative equipment set and report the collaborative equipment set to the TRP.

Figure 15:
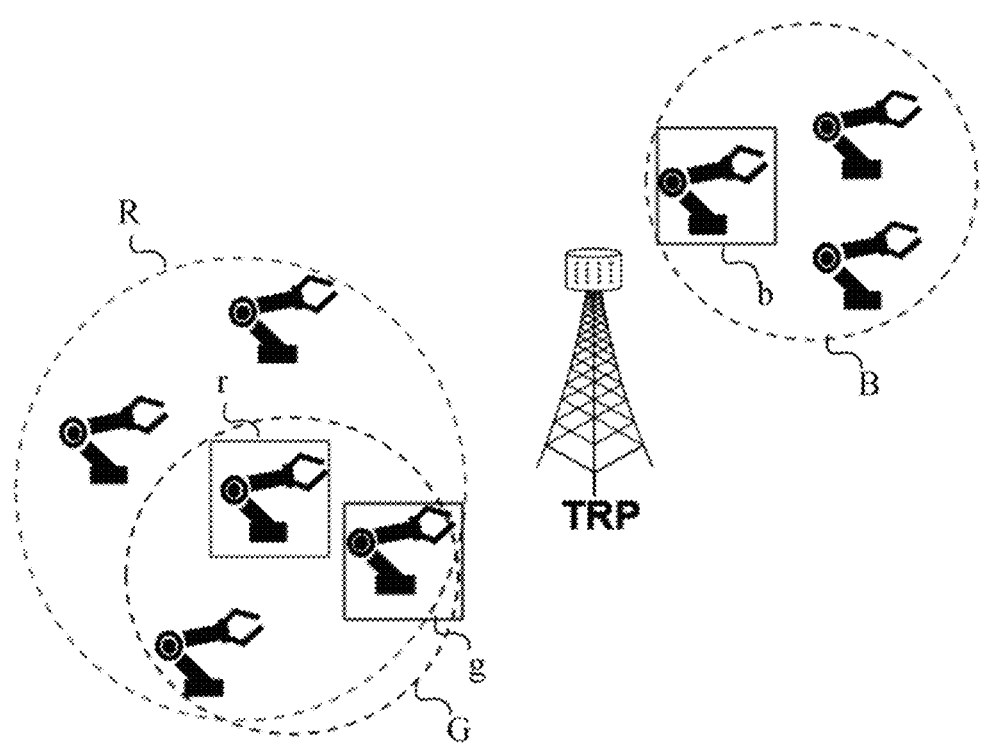
FIG. 15 is a schematic diagram for illustrating a spatially-collaborative equipment set.

FIG. 15 shows an example of a spatially-collaborative equipment set. For the equipment indicated by a block r, all other equipment in the dotted circle R serve as cooperative equipment of the equipment indicated by the block r, that is, the equipment in the dotted circle R form a spatially-collaborative equipment set of the equipment indicated by the block r. Similarly, the equipment in a dotted circle G form a spatially-collaborative equipment set of the equipment indicated by the block g, and the equipment in the dotted circle B form the spatially-collaborative equipment set of the equipment indicated by the block b. Eight equipments are shown in the Figure. Accordingly, a list of spatially-collaborative equipment sets contains eight spatially-collaborative equipment sets (spatially-collaborative equipment sets of the other five equipments are not marked for clarity).

In addition, assisted data transmission through the collaborative set may be in response to a request for a particular communication. According to an embodiment, the control unit 113 may be configured to transmit data in response to an URLLC request from the target equipment.

More particularly, when the target equipment makes an URLLC request, the TRP may select a collaborative equipment in the collaborative set for the target equipment based on the list. In addition, for example, the TRP may transmit data information simultaneously to the target equipment and the collaborative equipment in a form of information broadcasting.

Figure 17:
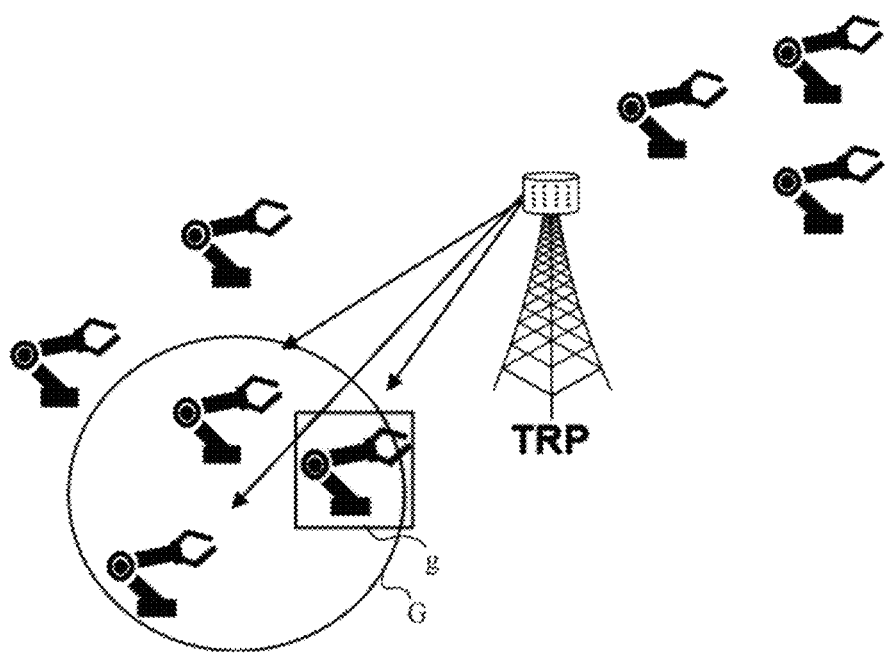
FIG. 17 is a schematic diagram for illustrating information transmission to a target spatially-collaborative set.

As an example, as shown in FIG. 17, in a case where the equipment indicated by the block g makes an URLLC request, the TRP transmits information simultaneously to three equipments (including one target equipment and two collaborative equipments) in the target spatially-collaborative equipment set.

In addition, information and data may be packaged in a form of a structure including a packet header and a data block to be transmitted. According to an embodiment, transmitting data may include transmitting a packet header and a data block. The packet header contains identification information of the target equipment and the data block contains data to be transmitted to the target equipment.

For a downlink, the packet header may include an equipment ID. For an uplink, the packet header may include a TRP ID.

Further, in order to reduce time spent in transmitting the packet header, according to an embodiment, the packet header and the data block may be transmitted through different channels. For example, the packet header may be transmitted through a URLLC-dedicated channel, and the data block may be transmitted through an existing channel, such as a physical shared channel.

In addition, in new radio (NR), for an application having a high requirement regarding a delay, in order to reduce the delay, a large subcarrier spacing may be used to shorten duration of an orthogonal frequency division multiplexing (OFDM) symbol, and a mini time slot (mini-slot) may be used to shorten duration of a time slot.

Accordingly, according to an embodiment, a length of an OFDM symbol of a channel for transmitting the packet header is less than a length of an OFDM symbol of a channel for transmitting the data block.

The URLLC-dedicated channel structure for transmitting the packet header may only occupy a small bandwidth, and a subcarrier spacing of the URLLC-dedicated channel may be much larger than that of a physical shared channel, that is, duration of the OFDM symbol (os) of the URLLC-dedicated channel may be much smaller than duration of the os of the physical shared channel, ensuring a low delay in transmitting the packet header without affecting a normal communication link of the system.

Figure 16:
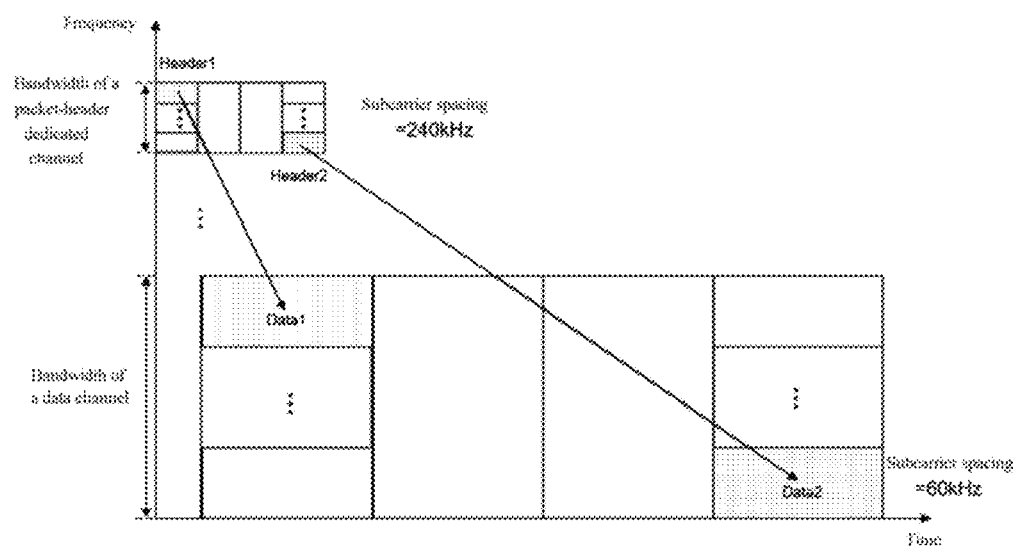
FIG. 16 is a schematic diagram for illustrating a mapping relation between a packet header and data.

FIG. 16 shows a configuration example of a packet-header dedicated channel and a data channel.

In addition, a mapping relation between the packet header and the data may be configurable. FIG. 16 further shows the mapping relation between the packet header and the data in the exemplary packet format.

Next, examples of processes of the target equipment and the collaborative equipment after the TRP transmits data for the target equipment jointly to the target equipment and the collaborative equipment are described below. In the following examples, the processes of the target equipment and the collaborative equipment are described by taking a case in which the information and data is packaged in a form of a structure including a packet header and a data block to be transmitted as described in previous embodiment as an example. However, it should be understood that the present disclosure is not limited to this.

On receipt of data transmission from the TRP, the target equipment and the collaborative equipment may decode the packet header to determine whether they are the target equipment or not.

The equipments in the spatial equipment set first receive the packet header. After receiving the packet header, the target equipment and the collaborative equipment in the spatial equipment set may decode the packet header immediately, and determine whether they are the target equipment based on the equipment ID in the packet header.

Figure 18:
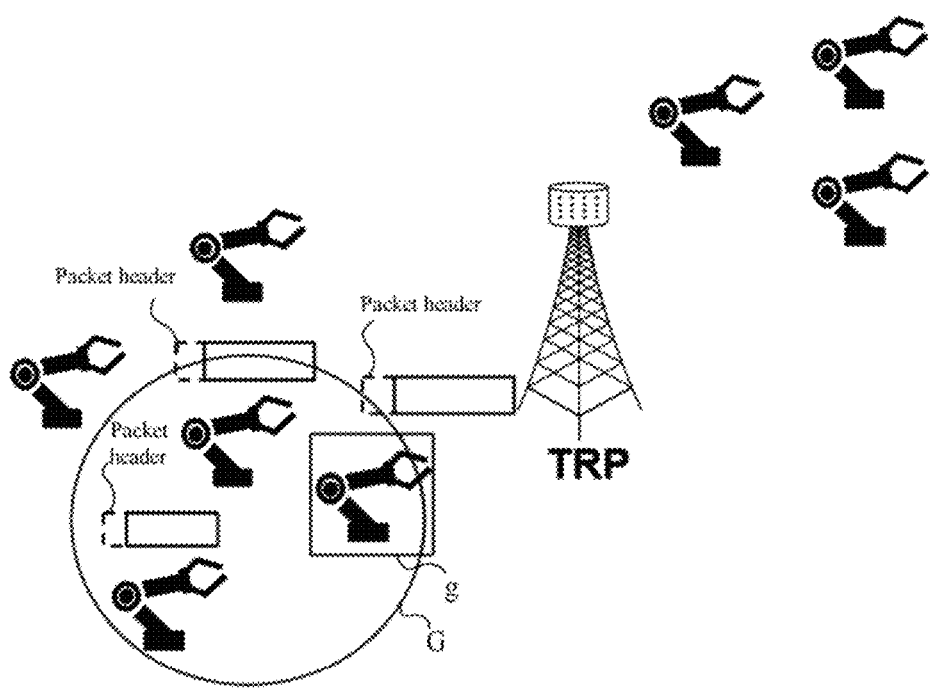
FIG. 18 is a schematic diagram for illustrating the target spatially-collaborative set decoding a packet header.

As shown in FIG. 18, the equipment indicated by the block g is the target equipment. After receiving the packet header, all equipment in the spatially-collaborative set indicated by G decodes the packet header immediately.

Examples of processes of the target equipment and the collaborative equipment are respectively described below.

In a case that an equipment determines itself as the target equipment of the data packet based on the packet header, the equipment processes the data block and may receive data retransmitted by the cooperative equipment while decoding the data block.

More specifically, the target equipment determines itself as the target equipment based on the equipment ID in the packet header after finishing decoding the packet header. After finishing receiving the data block, the target equipment decodes the data block immediately. In addition, the target equipment may receive data retransmitted by the collaborative equipment while decoding the data.

If the target equipment correctly receives the data from the TRP, the target equipment transmits ACK to the TRP, and a transmission process of a data packet is completed. If the target equipment does not successfully receive the data from the TRP, the target equipment transmits NACK to the TRP and the TRP retransmits the data packet.

In a case where an equipment determines itself as a collaborative equipment based on the packet header, the equipment may retransmit the data block to the target equipment and the target equipment performs joint detection on all received data.

More specifically, after finishing decoding the packet header, the collaborative equipment determines itself as a collaborative equipment based on the equipment ID in the packet header. After finishing receiving the data block, the collaborative equipment retransmits the data block to the target equipment. After finishing receiving the data retransmitted by the collaborative equipment, the target equipment may perform joint channel decoding on the data retransmitted by the collaborative equipment and data transmitted by the TRP. If Cyclic Redundancy Check (CRC) is successful, ACK is transmitted to the TRP and a transmission process of a data packet is completed. If CRC is not successful, NACK is transmitted to the TRP and the TRP retransmits the data packet.

Accordingly, for the TRP side, according to an embodiment, the control unit 113 may be configured to perform control, on receipt of an acknowledgement character (ACK) of the target equipment for the first data, to transmit second data, if there is the second data to be transmitted to the target equipment. The control unit 113 may further be configured to perform control, on receipt of a non-acknowledgement character (NACK) of the target equipment for the first data, to retransmit the first data. The control unit 113 may further be configured to stop retransmitting the first data, on receipt of an acknowledgement character for the first data after receipt of a non-acknowledgement character of the target equipment for the first data.

That is, if the target equipment transmits ACK after correctly receiving the data transmitted by the TRP, the TRP transmits a next data packet after receiving the ACK. If the target equipment transmits NACK after failing to correctly receive the data transmitted by the TRP, the TRP retransmits the data after receiving the NACK. If the target equipment transmits ACK after the joint channel decoding succeeds, then after receiving the ACK, the TRP stops retransmitting data and transmits a next data packet. If the target equipment does not successfully perform the joint channel decoding and transmits NACK, the TRP performs no operation after receiving the NACK, because the TRP has retransmitted data for the previous NACK.

Figure 19:
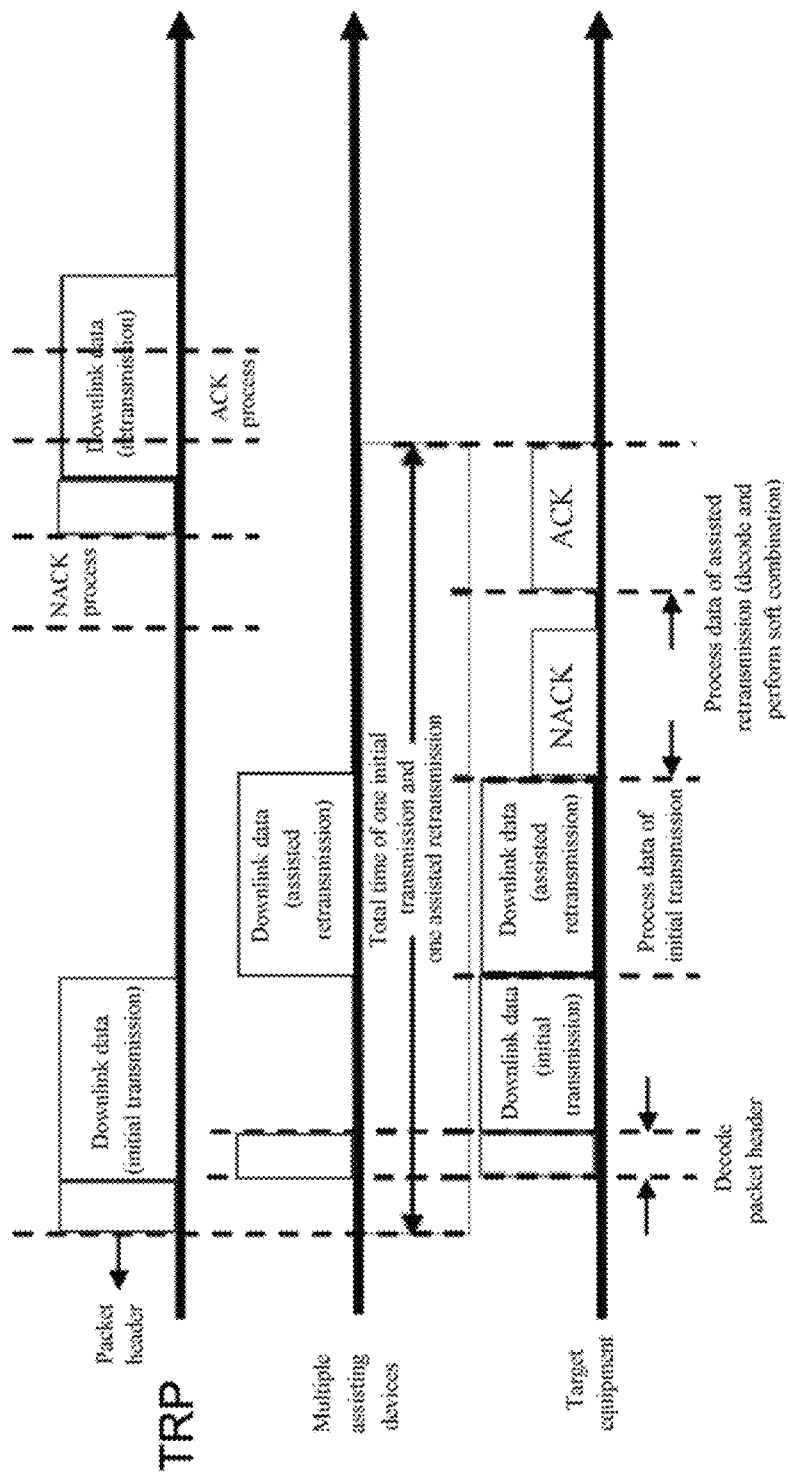
FIG. 19 is a timing diagram showing information transmission in an exemplary embodiment.

FIG. 19 is a timing diagram showing an example of information transmission.

As shown in FIG. 19, the TRP packets data in a form of a structure including a packet header and a data block. The target equipment and the collaborative equipment decode the packet header immediately after finishing receiving the packet header. After finishing decoding the packet header, the collaborative equipment retransmits (assists in retransmitting), immediately after finishing receiving the data block in the packet transmitted by the TRP, the data block to the target equipment. After finishing decoding the packet header, the target equipment decodes, immediately after finishing receiving the data block in the packet transmitted by the TRP, the data block, while receiving data retransmitted by the collaborative equipment.

In the example shown in FIG. 19, the data initially transmitted by the TRP is not correctly received by the target equipment, so that the target equipment transmits NACK to the TRP while performing joint detection on all received data. The TRP retransmits the packet after receiving the NACK. In addition, the target equipment transmits ACK to the TRP after the joint detection successfully performs decoding, and a transmission process of a packet is completed.

In the process described in the above example, the TRP collects information and establishes a list of spatially-collaborative equipment sets. When the target equipment makes a URLLC request, the TRP selects a collaborative equipment set corresponding to the target equipment based on the list, and transmits information simultaneously to the target equipment and the collaborative equipment. The collaborative equipment decodes the packet header and then retransmits the data. The target equipment decodes the packet header and the data, receives information retransmitted by the cooperative equipment while decoding the data, and performs joint detection on the received data.

By introducing collaborative retransmission by multiple equipment in spatial positions, high reliability of conventional information reception can be ensured while the transmission delay is reduced.

Figure 20:
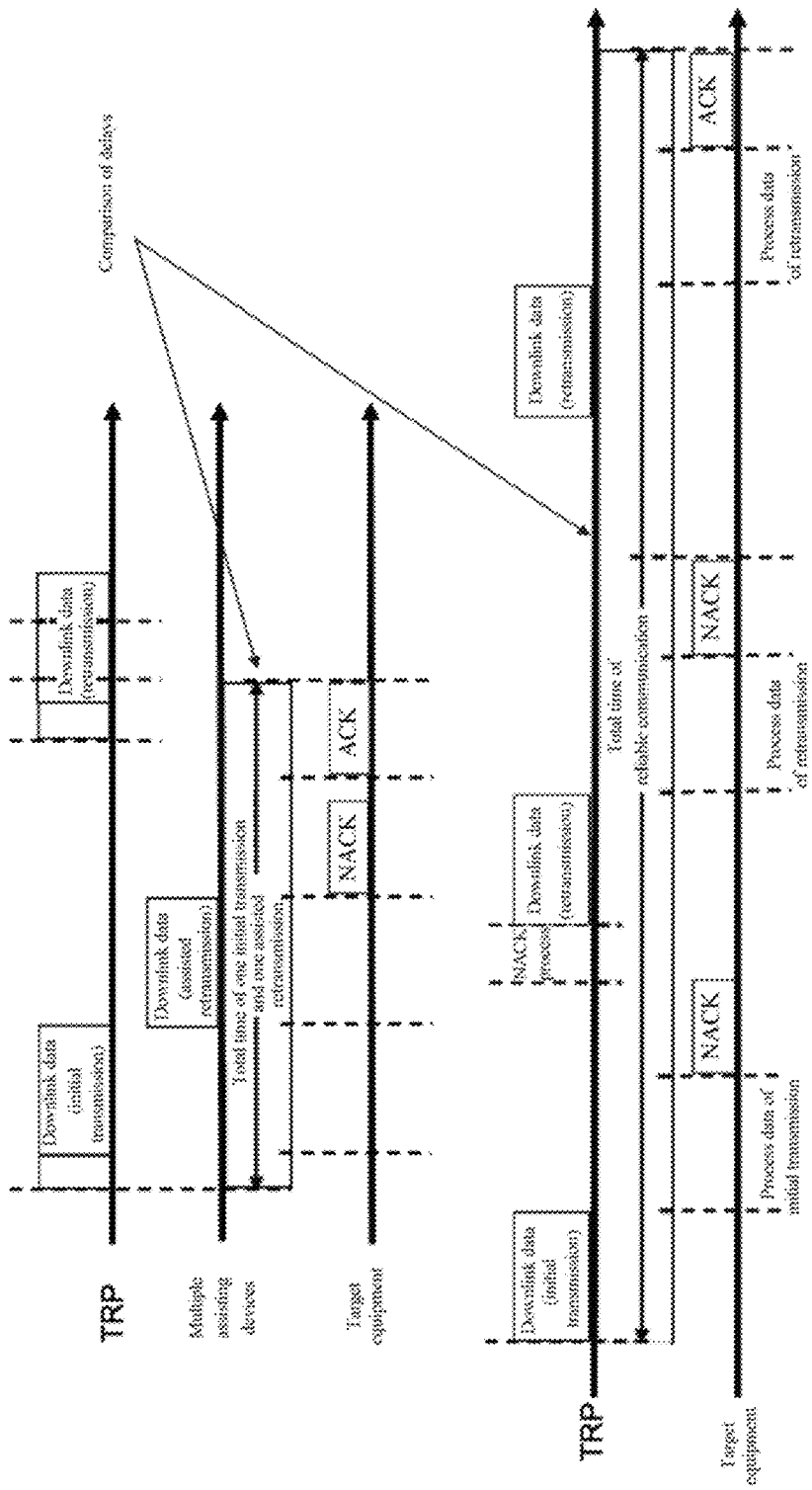
FIG. 20 shows comparison between a delay of information transmission in an exemplary embodiment and a delay of conventional information transmission.

FIG. 20 shows an example of comparison between a delay of Ultra-Reliable Low Latency Communication based on multi-equipment spatially-collaborative retransmission according to an embodiment of the present disclosure and a delay of conventional information transmission.

In the conventional information transmission, under a condition of a microsecond-level delay, an effective diversity gain cannot be obtained to combat fading. Main reasons are described as following. First, duration of a mini-slot used in URLLC to reduce the delay is much less than coherent time of a common wireless channel. Data retransmission in the same coherent time cannot resist deep fading of the channel, so that high-reliable transmission cannot be realized. Secondly, in the URLLC application scenario, Line-Of-Sight (LOS) communication is dominant, for which links are easily to crash due to occlusion. In addition, a coherent bandwidth of the channel is large in a high-frequency communication scene, and an effect of frequency diversity is not obvious.

With the spatially cooperative retransmission based on multiple equipments according to the embodiment of the present disclosure, high reliability and a low delay can be realized, and requirements of URLLC communication can be effectively satisfied.

It can be seen from FIG. 20 that due to inability to take advantages of diversity, it is likely to require multiple retransmissions to correctly transmit a packet with the conventional method. In the embodiments of the present disclosure, only one retransmission is required to correctly transmit the packet.

The spatially cooperative retransmission based on multiple equipments is provided according to the present disclosure. The spatially cooperative retransmission has effects of high reliability and a low delay, and can effectively meet requirements of URLLC communication.

Next, a downlink transmission process according to an exemplary embodiment is described with reference to FIG. 13. It should be noted that the exemplary embodiment includes aspects of the above multiple embodiments. However, the embodiments of the present disclosure are not required to be implemented as including all the aspects.

Figure 13:
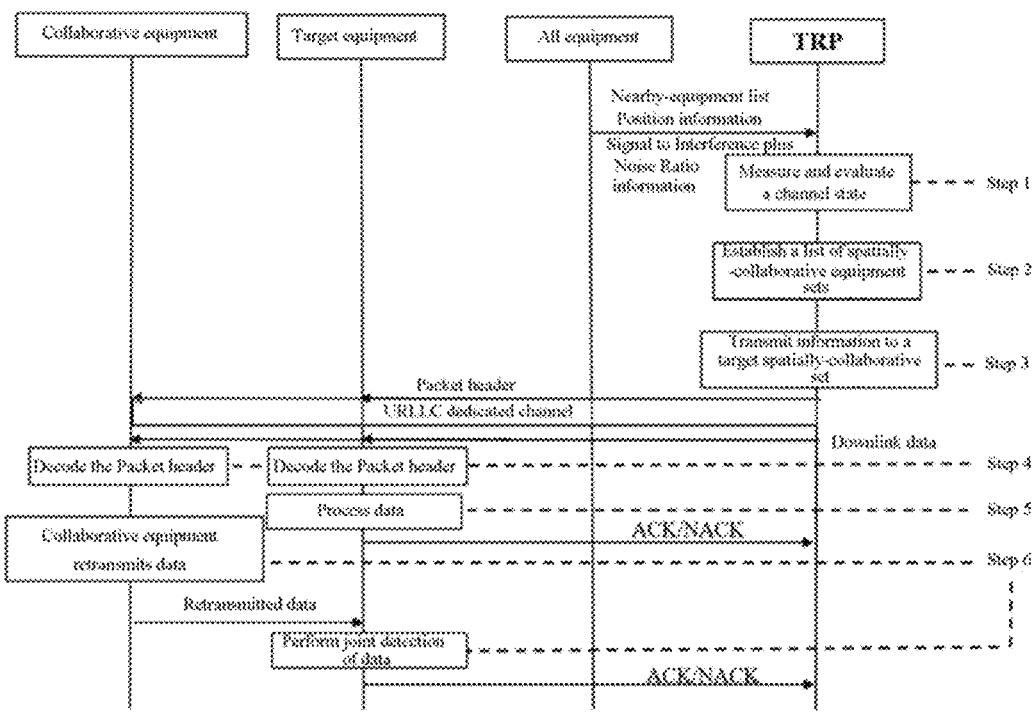
FIG. 13 is a flowchart showing signaling of a downlink transmission process in an exemplary embodiment.

As shown in FIG. 13, in step 1, the TRP measures and evaluates channel states with respect to the equipment.

In step 2, the TRP establishes a list of spatially-collaborative equipment sets based on the channel states.

In step 3, when the target equipment makes a URLLC request, the TRP transmits information to a target spatially-collaborative equipment set based on the list of spatially-collaborative equipment sets.

In step 4, the target equipment and the collaborative equipment decode a packet header to determine whether they are the target equipment or not.

In step 5, the target equipment processes the data block, and receives data retransmitted by the collaborative equipment while decoding the data.

In step 6, the collaborative equipment retransmits the data block to the target equipment and the target equipment performs joint detection on all received data.

In addition, the embodiments of the present disclosure may further be applied to uplink transmission.

Figure 14:
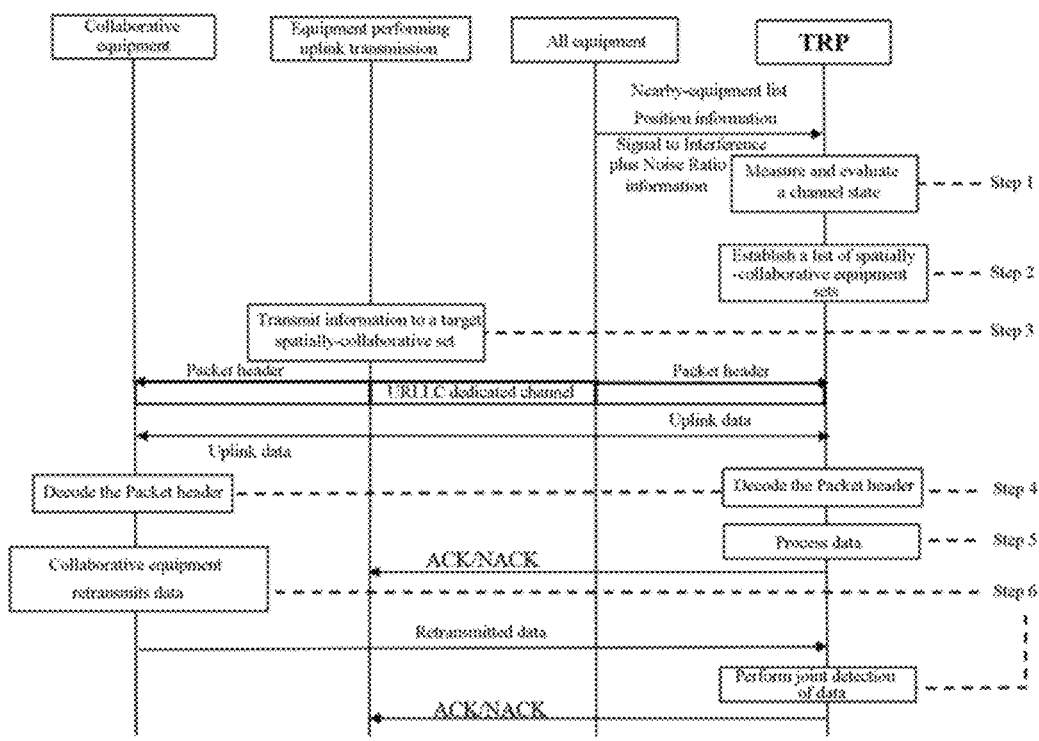
FIG. 14 is a flowchart showing signaling of a uplink transmission process in an exemplary embodiment.

As an example of uplink transmission, as shown in FIG. 14, step 1 and step 2 in the whole process are similar to corresponding steps in the downlink transmission.

In step 3, when making a URLLC request, an equipment transmitting uplink information transmits information to a collaborative equipment in a spatially-collaborative equipment set and the TRP.

In addition, step 4, step 5, and step 6 are similar to corresponding steps in the downlink transmission except for that the target equipment of the transmission is the TRP.

The embodiments of the present disclosure can be applied to the uplink transmission and the downlink transmission, and the uplink transmission and the downlink transmission do not affect each other. In addition, the embodiments of the present disclosure can realize a low delay of data transmission, for example, a delay less than ten microseconds, and can realize high reliability of transmission. In particular, for the high-frequency communication dominated by the LOS communication, link collapse is easily caused due to occlusion, and this disadvantage can be effectively overcame by the embodiments of the present disclosure. In addition, the embodiments of the present disclosure can be applied to a complex factory environment and can meet requirements of factory automation for delay and reliability. A spatially-collaborative equipment set may be established in multiple manners in the embodiments of the present disclosure, and the manners may be flexibly adjusted comprehensively based on various conditions such as a reliability requirement of a system, the number of effective equipment in the system, a communication mode of the equipment, and a resource bandwidth of the system.

Some processes and methods are apparently disclosed in the above description of the electronic device according to the embodiments of the present disclosure. Next, a wireless communication method according to the embodiments of the present disclosure is described without repeating details that are described above.

Figure 2:
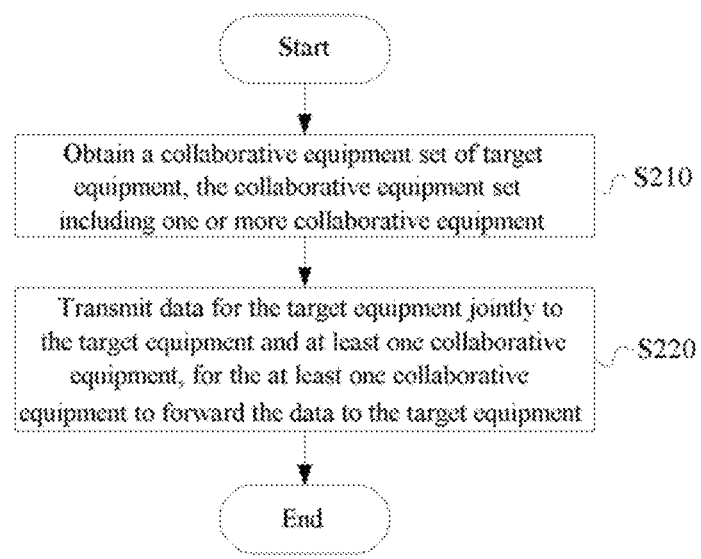
FIG. 2 is a flowchart of a process example of a wireless communication method according to an embodiment of the present disclosure.

As shown in FIG. 2, a wireless communication method according to an embodiment includes a step S210 in which a collaborative equipment set of a target equipment is obtained. The collaborative equipment set includes one or more collaborative equipments. In addition, the method further includes a step S220 in which data for the target equipment is jointly transmitted to the target equipment and at least one collaborative equipment, for the at least one collaborative equipment to forward the data to the target equipment.

The method according to the embodiment, for example, may be implemented on a TRP side.

In addition, a device and a method that are implemented on a terminal device side are further provided according to the present disclosure. Next, embodiments of the device and the method that are implemented on the terminal device side are given without repeating the details corresponding to the details previously described for the TRP side.

Figure 3:
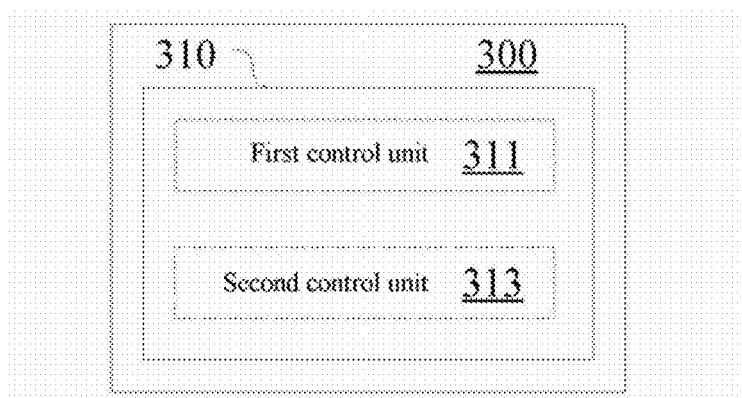
FIG. 3 is a block diagram showing a configuration example of an electronic device for wireless communication according to another embodiment of the present disclosure.

FIG. 3 shows a configuration example of an electronic device used for an assisting device side. The electronic device 300 according to the embodiment includes processing circuitry 310. The processing circuitry 310 includes a first control unit 311 and a second control unit 313.

The first control unit 311 is configured to perform control to receive data transmission from a wireless access point (TRP). The data transmission contains identification information of target equipment and data for the target equipment.

The data transmission may include a packet header and a data block. The packet header contains the identification information and the data block contains data.

In addition, the first control unit 311 may be configured to perform control to receive the packet header and the data block through different channels. A length of an OFDM symbol of a channel for receiving the packet header is less than a length of an OFDM symbol of a channel for receiving the data block.

The second control unit 313 is configured to perform control to forward the data to the target equipment, in a case where it is determined based on the identification information that current equipment is not the target equipment.

The second control unit 313 may be configured to decode the packet header to obtain the identification information, and forward the data block to the target equipment based on the identification information without decoding the data block.

Figure 4:
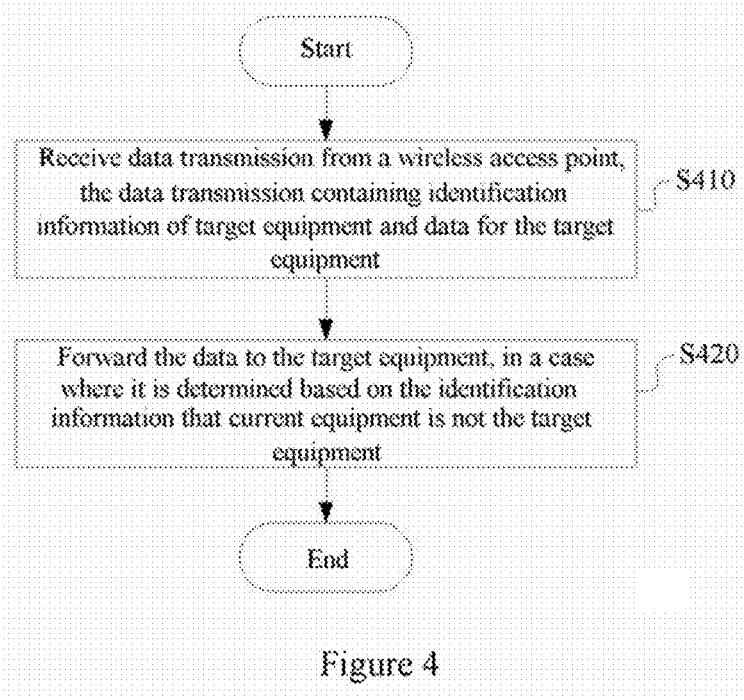
FIG. 4 is a flowchart of a process example of a wireless communication method according to another embodiment of the present disclosure.

FIG. 4 shows a process example of a wireless communication method implemented at an assisting device side. The method includes a step S410 in which data transmission is received from the wireless access point. The data transmission includes identification information of the target equipment and data for the target equipment. The method further includes a step S420 in which the data is forwarded to the target equipment in a case where it is determined based on the identification information that the current equipment is not the target equipment.

Next, a configuration example of an electronic device used for a target equipment side is described. The configuration example is described with reference to FIG. 3 for brevity.

The electronic device 300 according to the embodiment includes processing circuitry 310. The processing circuitry 310 includes a first control unit 311 and a second control unit 313.

The first control unit 311 is configured to perform control to receive data transmission from a wireless access point. The data transmission contains identification information of target equipment and data for the target equipment.

The second control unit 313 is configured to perform control to receive the data from the wireless access point that is forwarded by at least one collaborative equipment, in a case where it is determined based on the identification information that current equipment is the target equipment.

The data transmitted may be transmitted in response to a URLLC request of the target equipment. The second control unit 313 may be configured to perform control to transmit an URLLC request for the data to the wireless access point.

In addition, according to an embodiment, the collaborative equipment set may be determined by the target equipment.

Figure 5:
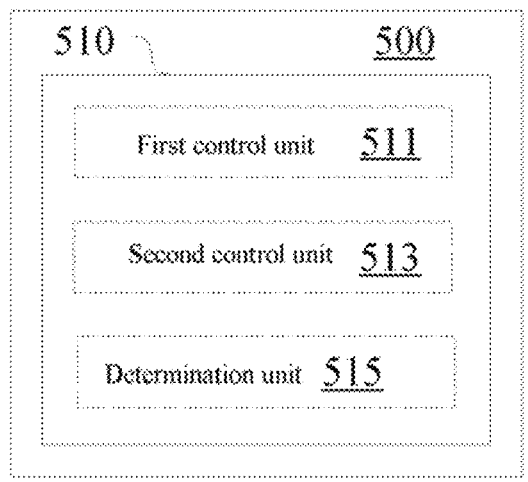
FIG. 5 is a block diagram showing a configuration example of an electronic device for wireless communication according to another embodiment of the present disclosure.

As shown in FIG. 5, the electronic device 500 according to the embodiment includes processing circuitry 510. The processing circuitry 5010 includes a first control unit 511, a second control unit 513 and a determination unit 515. Configurations of the first control unit 511 and the second control unit 513 are similar to configurations of the first control unit 311 and the second control unit 313 in the above embodiments.

The determination unit 515 is configured to determine a collaborative equipment set. The collaborative equipment set includes one or more collaborative equipment.

The second control unit 513 is further configured to perform control to inform the wireless access point of the determined collaborative equipment set.

Alternatively, the collaborative equipment set may be determined by the TRP. According to an embodiment, the second control unit 313 may be configured to perform control to transmit one or more items of the following information to the wireless access point: a nearby-equipment list of current equipment; position information of the current equipment; quality of communication of the current equipment with the wireless access point; and quality of communication of the current equipment with other equipment. In this way, the TRP determines the collaborative equipment set based on the above information.

In addition, the data transmission received by the first control unit 311 may include a packet header and a data block. The packet header contains identification information and the data block contains data.

The first control unit 311 may further be configured to perform control to receive the packet header and the data block through different channels. A length of an OFDM symbol of a channel for receiving the packet header may be less than a length of an OFDM symbol of a channel for receiving the data block.

According to an embodiment, the processing circuitry 310 may further be configured to decode the packet header to obtain the identification information, decode the data block and receive data from the collaborative equipment in a case where it is determined based on the identification information that current equipment is the target equipment. The processing circuitry 310 may further be configured to transmit an acknowledgement character to the wireless access point in a case where the data transmission from the wireless access point is correctly received, and transmit a non-acknowledgement character to the wireless access point in a case where the data transmission from the wireless access point is not correctly received.

In addition, the processing circuitry 310 may further be configured to perform joint decoding on the data from the wireless access point and the data from the collaborative equipment after receipt of the data from the collaborative equipment; and transmit an acknowledgement character to the wireless access point in a case where a cyclic redundancy check is successful and transmit a non-acknowledgement character to the wireless access point in a case where a cyclic redundancy check is unsuccessful.

Figure 6:
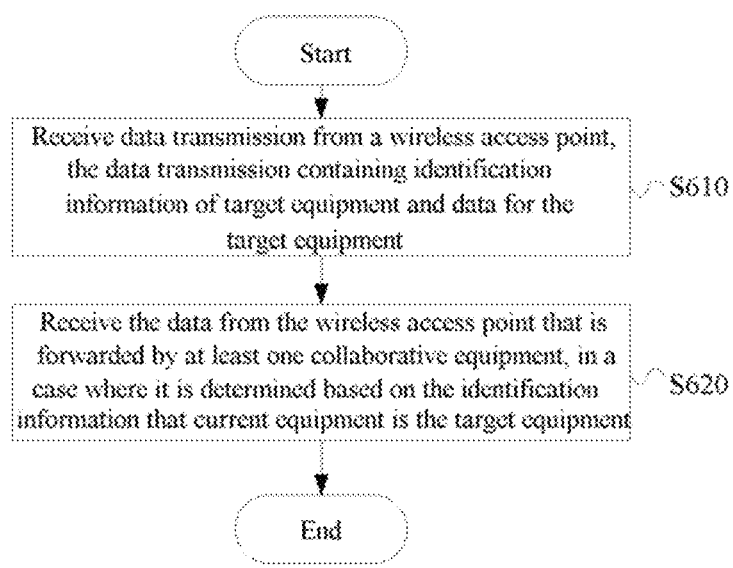
FIG. 6 is a flowchart of a process example of a wireless communication method according to another embodiment of the present disclosure.

FIG. 6 shows a process example of a wireless communication method implemented on a target equipment side. The method includes a step S610 in which data transmission from a wireless access point is received. The data transmission contains identification information of target equipment and data for the target equipment. The method further includes receiving the data from the wireless access point that is forwarded by at least one collaborative equipment, in a case where it is determined based on the identification information that current equipment is the target equipment.

As described above with reference to FIG. 14, the embodiments of the present disclosure may be applied to uplink transmission. Next, embodiments of a device and a method for uplink transmission are described without repeating details corresponding to the details that are described above.

A configuration example of an electronic device used for a TRP side for the uplink transmission is described with reference to FIG. 3.

An electronic device 300 according to the embodiment includes processing circuitry 310. The processing circuitry 310 includes a first control unit 311 and a second control unit 313.

The first control unit 311 is configured to perform control to receive data transmission from target equipment. The data transmission contains identification information of a wireless access point and data for the wireless access point.

The second control unit 313 is configured to perform control to receive data from the target equipment that is forwarded by at least one collaborative equipment.

As described above, the collaborative equipment set of the target equipment may be determined by the TRP, and an embodiment is described with reference to FIG. 5.

An electronic device 500 according to the embodiment includes processing circuitry 510. The processing circuitry 510 includes a first control unit 511, a second control unit 513 and a determination unit 515. Configurations of the first control unit 511 and the second control unit 513 are similar to those in the above embodiments.

The determination unit 515 is configured to determine a collaborative equipment set for the target equipment. The collaborative equipment set includes one or more collaborative equipment.

Figure 7:
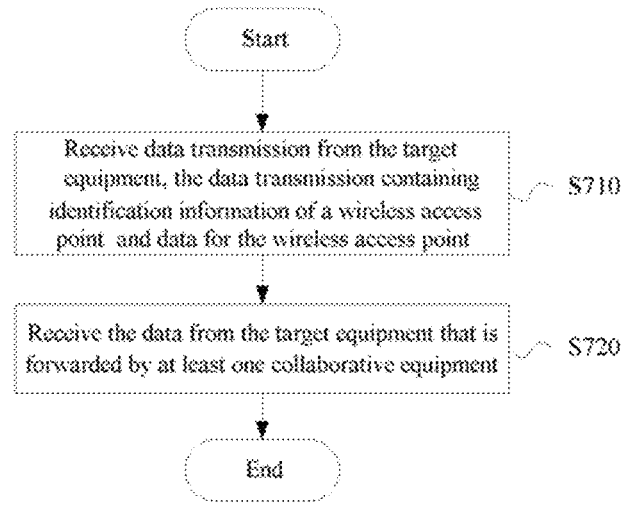
FIG. 7 is a flowchart of a process example of a wireless communication method according to another embodiment of the present disclosure.

FIG. 7 shows a process example of the wireless communication method implemented on the TRP side for uplink transmission. The method includes a step S710 in which data transmission is received from target equipment. The data transmission contains identification information of a wireless access point and data for the wireless access point. The method further includes receiving the data from the target equipment that is forwarded by at least one collaborative equipment.

A configuration example of an electronic device used on an assisting device side for uplink transmission is described below with reference to FIG. 3.

An electronic device 300 according to the embodiment includes processing circuitry 310. The processing circuitry 310 includes a first control unit 311 and a second control unit 313.

The first control unit 311 is configured to perform control to receive data transmission from target equipment. The data transmission contains identification information of a wireless access point and data for the wireless access point.

The second control unit 313 is configured to perform control to forward the data to the wireless access point based on the identification information.

Figure 8:
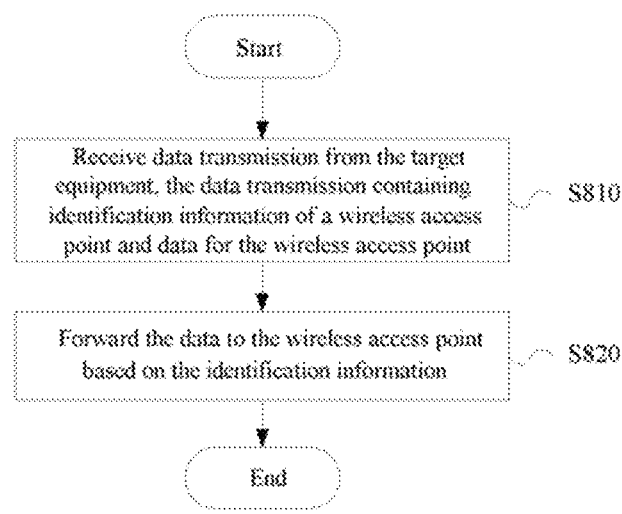
FIG. 8 is a flowchart of a process example of a wireless communication method according to another embodiment of the present disclosure.

FIG. 8 shows a process example of the wireless communication method implemented on an assisting device side for uplink transmission. The method includes a step S810 in which data transmission is received from target equipment. The data transmission contains identification information of a wireless access point and data for the wireless access point. The method further includes a step S820 in which the data is forwarded to the wireless access point based on the identification information.

A configuration example of an electronic device used for a target equipment side for uplink transmission is described below with reference to FIG. 3.

The electronic device 300 according to the embodiment includes processing circuitry 310. The processing circuitry 310 includes a first control unit 311 and a second control unit 313.

The first control unit 311 is configured to perform control to transmit data transmission to a wireless access point. The data transmission contains identification information of the wireless access point and data for the wireless access point.

The second control unit 313 is configured to perform control to transmit the data to at least one collaborative equipment, for the at least one collaborative equipment to forward the data to the wireless access point.

Figure 9:
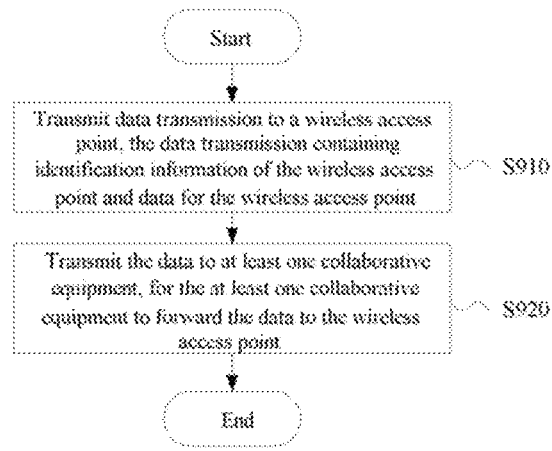
FIG. 9 is a flowchart of a process example of a wireless communication method according to another embodiment of the present disclosure.

FIG. 9 shows a process example of a wireless communication method implemented on a target equipment side for uplink transmission. The method includes a step S910 in which data transmission is transmitted to a wireless access point. The data transmission contains identification information of a wireless access point and data for the wireless access point. The method further includes a step S920 in which the data is transmitted to at least one collaborative equipment, for the at least one collaborative equipment to forward the data to the wireless access point.

In addition, a computer readable medium is further provided according to an embodiment of the present disclosure. The computer readable medium includes instructions that, when executed by an information processing apparatus, cause the information processing apparatus to implement the above methods.

Various Steps of the above method and various component modules and/or units of the above device may be implemented as software, firmware, hardware or a combination thereof. In a case that the steps and component modules and/or units are implemented by software or firmware, a program constituting the software used for implementing the above method may be installed from a storage medium or network to a computer with a dedicated hardware structure (for example, a general computer 1400 shown in FIG. 10). The computer can perform various functions when being installed with various programs.

Figure 10:
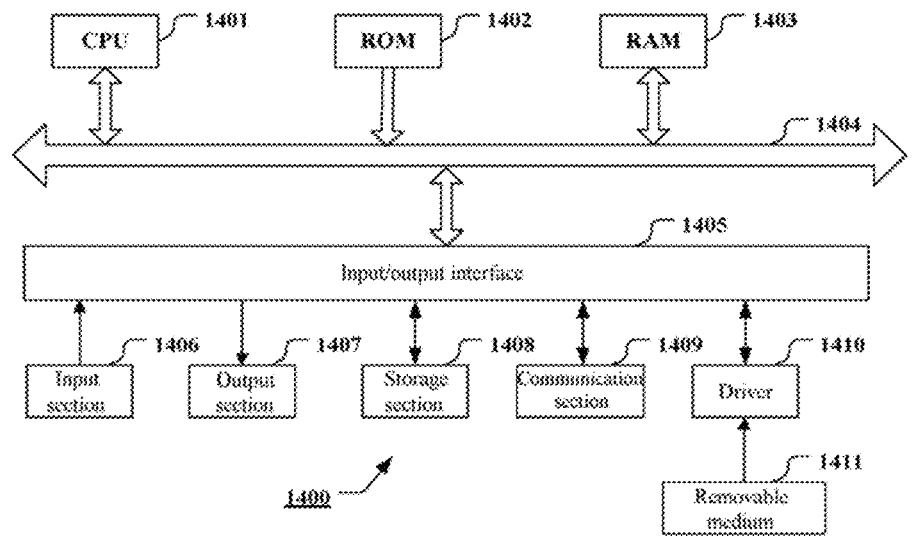
FIG. 10 is a block diagram of an exemplary structure of a computer for implementing a method and equipment according to the present disclosure.

In FIG. 10, a central processing unit (CPU) 1401 executes various processing according to a program stored in a read-only memory (ROM) 1402 or a program loaded from a storage section 1408 to a random access memory (RAM) 1403. Data required when the CPU 1401 performs various processing is also stored in the RAM 1403 as needed. The CPU 1401, the ROM 1402 and the RAM 1403 are linked with each other via a bus 1404. An input/output interface 1405 is also linked to the bus 1404.

The following components are linked to the input/output interface 1405: an input portion 1406 (including a keyboard, a mouse and the like; an output portion 1407 including a display such as a cathode ray tube (CRT), a liquid crystal display (LCD), a speaker and the like); a storage section 1408 (including a hard disk and the like); and a communication section 1409 (including a network interface card such as a local area network (LAN) card, a modem and the like). The communication section 1409 performs communication processing via a network such as the Internet. A driver 1410 may also be linked to the input/output interface 1405 as needed. A removable medium 1411 such as a magnetic disk, an optical disk, a magneto-optical disk, and a semiconductor memory is mounted on the driver 1410 as needed, so that a computer program read from the removable medium 1411 is installed in the storage section 1408 as needed.

In a case that the above series of processing is implemented by software, the program constituting the software is installed from the network such as the Internet or the storage medium such as the removable medium 1411.

Those skilled in the art should understand that the storage medium is not limited to the removable medium 1411 shown in FIG. 10 that stores the program and is distributed separately from the apparatus so as to provide the program to the user. Examples of the removable medium 1411 include a magnetic disk (including a floppy disk (registered trademark)), an optical disk (including a compact disk read only memory (CD-ROM) and a digital versatile disc (DVD)), a magneto-optical disk (including a MiniDisc (MD) (registered trademark)), and a semiconductor memory. Alternatively, the storage medium may be the ROM 1402, a hard disk included in the storage section 1408 or the like. The storage medium has a program stored therein and is distributed to the user together with a device in which the storage medium is included.

The embodiments of the present disclosure further relates to a program product storing machine-readable instruction codes that when read and executed by a machine, performs the methods according to the embodiments of the present disclosure.

A storage medium for carrying the program product storing machine-readable instruction codes is further included in the present disclosure. The storage medium includes but is not limited to a floppy disk, an optical disc, a magneto-optical disc, a memory card, a memory rod and the like.

The embodiments of the present disclosure further relates to the following electronic device. In a case that the electronic device is applied to a base station side, the electronic device may be implemented as any types of gNB and Evolved Node B (eNB) such as a macro eNB and a small eNB. The small eNB may be an eNB of a cell having a smaller coverage than a macro cell, such as a pico eNB, a micro eNB and a home (femto) eNB. Alternatively, the electronic device may be implemented as any other types of base stations, such as a Node B and a base transceiver station (BTS). The electronic device may include: a main body (also referred to as a base station device) configured to control the wireless communication; and one or more remote radio heads (RRH) arranged at a different location from the main body. In addition, each of various types of terminals described below can operate as a base station by performing a function of a base station temporarily or semi-permanently.

In a case that the electronic device is used for a user equipment side, the electronic device may be implemented as a mobile terminal (such as a smartphone, a tablet personal computer (PC), a notebook PC, a portable game terminal, a portable/dongle mobile router and a digital camera) or a vehicle terminal (such as a vehicle navigation device). In addition, the electronic device may further be a wireless communication module (such as an integrated circuitry module including a single wafer or multiple wafers) mounted on each of the above terminals.

[Application Example of a Terminal Device]

Figure 11:
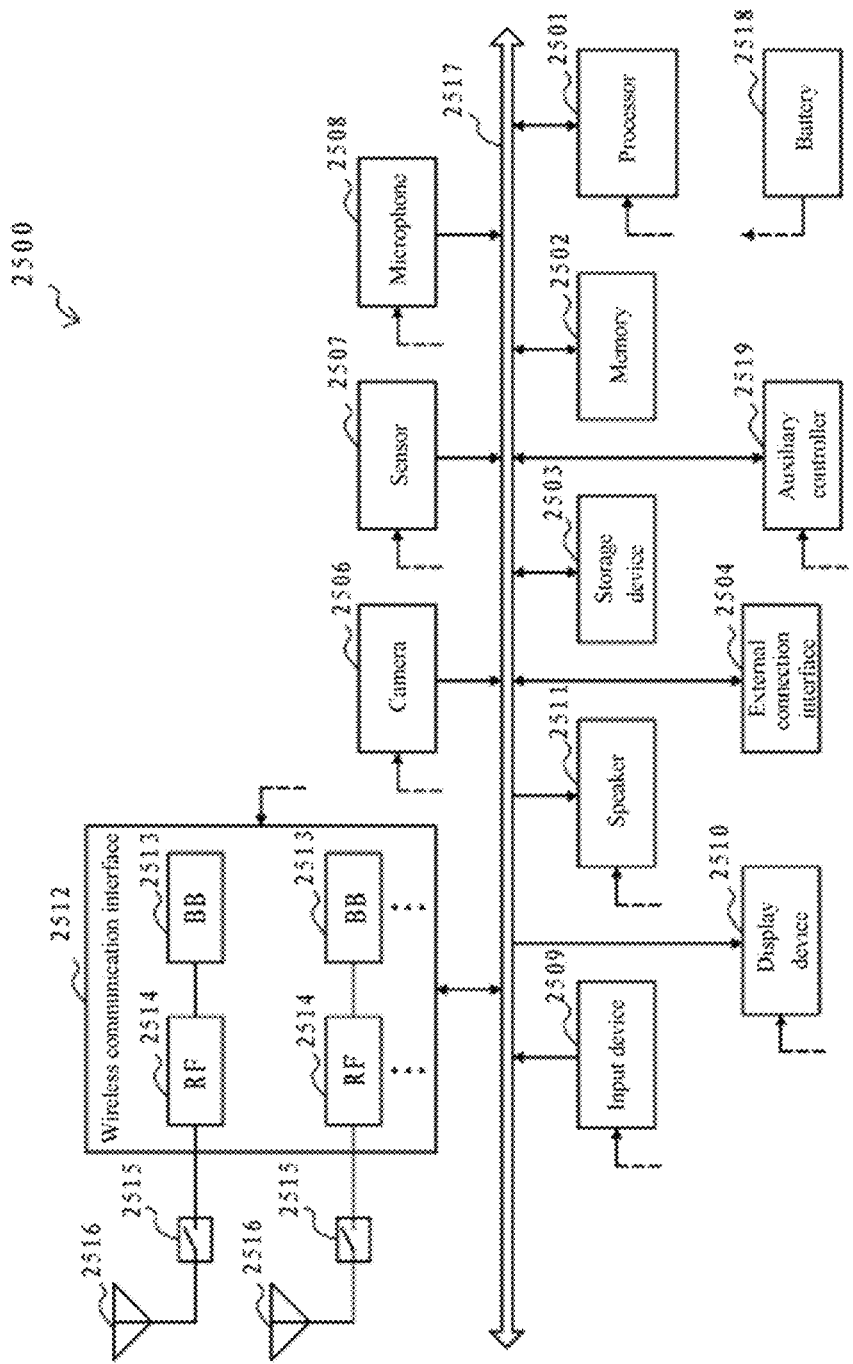
FIG. 11 is a block diagram showing an example of exemplary configuration of a smartphone to which technology according to the present disclosure may be applied.

FIG. 11 is a block diagram showing an exemplary configuration of a smartphone 2500 to which technology according to the present disclosure may be applied. The smartphone 2500 includes a processor 2501, a memory 2502, a storage device 2503, an external connection interface 2504, a camera 2506, a sensor 2507, a microphone 2508, an input device 2509, a display device 2510, a speaker 2511, a wireless communication interface 2512, one or more antenna switches 2515, one or more antennas 2516, a bus 2517, a battery 2518 and an auxiliary controller 2519.

The processor 2501 may be, for example, a CPU or a system on chip (SoC), and controls functions of an application layer and another layer of the smartphone 2500. The memory 2502 includes an RAM and an ROM, and stores data and a program executed by the processor 2501 and data. The storage device 2503 may include a storage medium such as a semiconductor memory and a hard disk. The external connection interface 2504 is an interface for connecting an external device (such as a memory card and a universal serial bus (USB) device) to the smartphone 2500.

The camera 2506 includes an image sensor (such as a charge coupled device (CCD) and a complementary metal oxide semiconductor (CMOS)), and generates a captured image. The sensor 2507 may include a group of sensors such as a measurement sensor, a gyro sensor, a geomagnetic sensor, and an acceleration sensor. The microphone 2508 converts sound that is inputted to the smartphone 2500 into an audio signal. The input device 2509 includes, for example, a touch sensor configured to detect a touch on a screen of the display device 2510, a keypad, a keyboard, a button, or a switch, and receives an operation or information inputted from a user. The display device 2510 includes a screen (such as a liquid crystal display (LCD) and an organic light-emitting diode (OLED) display), and displays an output image of the smartphone 2500. The speaker 2511 is configured to convert an audio signal outputted from the smartphone 2500 into sound.

The wireless communication interface 2512 supports any cellular communication scheme (such as LTE and LTE-Advanced), and performs wireless communications. The wireless communication interface 2512 may include, for example, a base band (BB) processor 2513 and radio frequency (RF) circuitry 2514. The BB processor 2513 may perform, for example, coding/decoding, modulating/demodulating and multiplexing/de-multiplexing, and perform various types of signal processing for wireless communications. The RF circuitry 2514 may include, for example, a mixer, a filter and an amplifier, and transmits and receives a wireless signal via an antenna 2516. The wireless communication interface 2512 may be a chip module having the BB processor 2513 and the RF circuitry 2514 integrated thereon. As shown in FIG. 11, the wireless communication interface 2512 may include multiple BB processors 2513 and multiple RF circuitry 2514. Although FIG. 11 shows an example in which the wireless communication interface 2512 includes the multiple BB processors 2513 and the multiple RF circuitry 2514, the wireless communication interface 2512 may include a single BB processor 2513 or single RF circuitry 2514.

Besides the cellular communication scheme, the wireless communication interface 2512 may support an additional type of wireless communication scheme, such as a short-distance wireless communication scheme, a near field communication scheme and a wireless local area network (LAN) scheme. In this case, the wireless communication interface 2512 may include the BB processor 2513 and the RF circuitry 2514 for each wireless communication scheme.

Each of the antenna switches 2515 switches a connection destination of the antenna 2516 among multiple circuitry (such as circuitry for different wireless communication schemes) included in the wireless communication interface 2512.

Each of the antennas 2516 includes a single antenna element or multiple antenna elements (such as multiple antenna elements included in an MIMO antenna), and is used for the wireless communication interface 2512 to transmit and receive a wireless signal. The smartphone 2500 may include multiple antennas 2516, as shown in FIG. 11. Although FIG. 11 shows an example in which the smartphone 2500 includes the multiple antennas 2516, the smartphone 2500 may also include a single antenna 2516.

In addition, the smartphone 2500 may include an antenna 2516 for each type of wireless communication scheme. In this case, the antenna switches 2515 may be omitted from the configuration of the smartphone 2500.

The processor 2501, the memory 2502, the storage device 2503, the external connection interface 2504, the camera 2506, the sensor 2507, the microphone 2508, the input device 2509, the display device 2510, the speaker 2511, the wireless communication interface 2512, and the auxiliary controller 2519 are connected to each other via the bus 2517. The battery 2518 supplies power to blocks of the smartphone 2500 shown in FIG. 11 via feeders that are partially shown with dashed lines in the drawings. The auxiliary controller 2519, for example, operates a minimum necessary function of the smartphone 2500 in a sleep mode.

In the smartphone 2500 shown in FIG. 11, a transceiver of a wireless communication device on a user equipment side according to an embodiment of the present disclosure may be implemented by the radio communication interface 2512. At least a part of functions of processing circuitry and/or units of the electronic device or wireless communication device on the user equipment side according to the embodiments of the present disclosure may be implemented by the processor 2501 or the auxiliary controller 2519. For example, a part of functions of the processor 2501 may be performed by the auxiliary controller 2519 to reduce power consumption of the battery 2518. In addition, the processor 2501 or the auxiliary controller 2519 may perform at least a part of functions of the processing circuitry and/or the units of the electronic device or the wireless communication device on the user equipment side according to the embodiments of the present disclosure by executing a program stored in the memory 2502 or the storage device 2503.

[Application Example of a Base Station]

Figure 12:
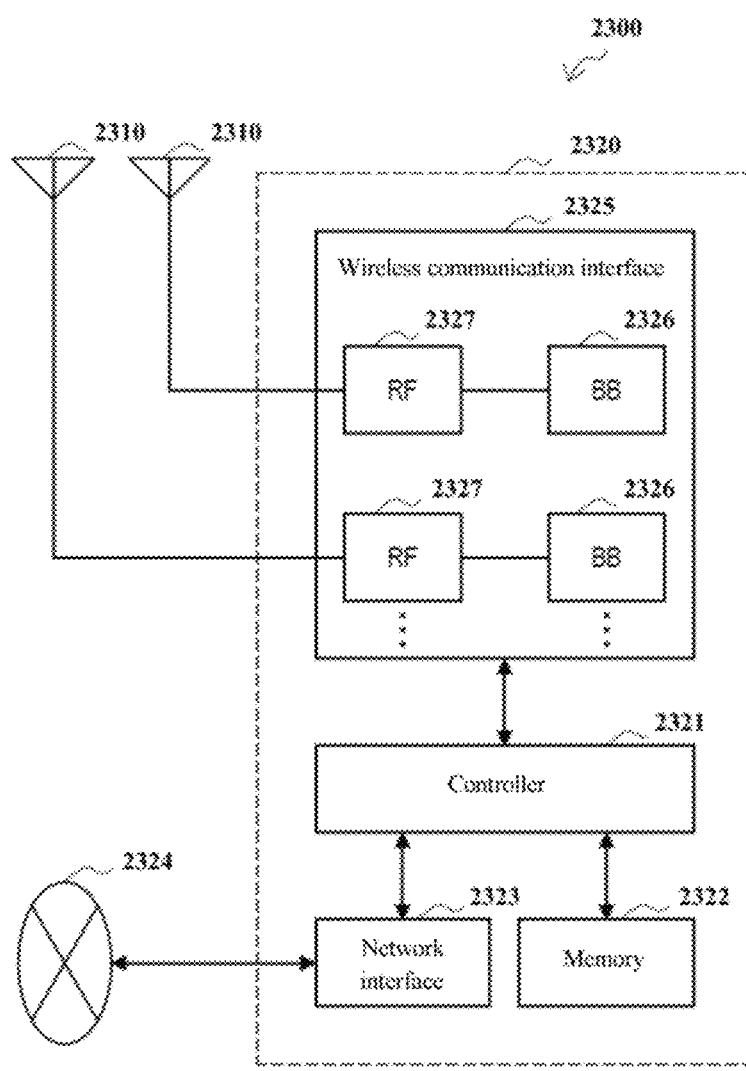
FIG. 12 is a block diagram showing an example of exemplary configuration of a Node B in a 5G system (gNB) to which technology according to the present disclosure may be applied.

FIG. 12 is a block diagram showing an example of exemplary configuration of a gNB to which technology according to the present disclosure may be applied. A gNB 2300 includes one or more antennas 2310 and a base station device 2320. Each of the antennas 2310 is connected to the base station device 2320 via a radio frequency (RF) cable.

Each of the antennas 2310 includes a single antenna element or multiple antenna elements (such as multiple antenna elements included in a multiple-input multiple-output (MIMO) antenna), and is used for the base station device 2320 to transmit and receive a wireless signal. The gNB 2300 may include multiple antennas 2310, as shown in FIG. 12. For example, the multiple antennas 2310 may be compatible with multiple frequency bands used by the gNB 2300. Although FIG. 12 shows an example in which the gNB 2300 includes the multiple antennas 2310, the gNB 2300 may also include a single antenna 2310.

The base station device 2320 includes a controller 2321, a memory 2322, a network interface 2323 and a wireless communication interface 2325.

The controller 2321 may be, for example, a CPU or a DSP, and operate various functions of a high layer of the base station device 2320. For example, the controller 2321 generates a data packet according to data in a signal processed by the wireless communication interface 2325 and transmits the generated packet via the network interface 2323. The controller 2321 may bundle data from multiple baseband processors to generate a bundled packet and transmit the generated bundled packet. The controller 2321 may have a logic function that performs control such as wireless resource control, wireless bearer control, mobility management, admission control, and scheduling. The control may be performed in combination with a nearby gNB or core network node. The memory 2322 includes an RAM and an ROM, and stores a program executed by the controller 2321 and various types of control data (such as a terminal list, transmission power data and scheduling data).

The network interface 2323 is a communication interface via which the base station device 2320 is connected to a core network 2324. The controller 2321 may communicate with a core network node or another gNB via the network interface 2323. In this case, the gNB 2300 may be connected to the core network node or another gNB via a logical interface (such as an interface Si and an interface X2). The network interface 2323 may also be a wired communication interface or a wireless communication interface for wireless backhaul line. If the network interface 2323 is the wireless communication interface, the network interface 2323 may use a frequency band for wireless communication higher than a frequency band used by the wireless communication interface 2325.

The wireless communication interface 2325 supports any cellular communication scheme (such as long term evolution (LTE) and LTE-Advanced), and provides wireless connection to a terminal located in a cell of the gNB 2300 via an antenna 2310. The wireless communication interface 2325 may include, for example, a BB processor 2326 and RF circuitry 2327. The BB processor 2326 may perform, for example, encoding/decoding, modulating/demodulating and multiplexing/de-multiplexing, and various types of signal processing of layers (such as L1, medium access control (MAC), radio link control (RLC) and packet data convergence protocol (PDCP)). Instead of the controller 2321, the BB processor 2326 may have a part or all of the above logic functions. The BB processor 2326 may be implemented as a memory storing a communication control program, or a module including a processor configured to execute a program and related circuitry. The function of the BB processor 2326 may be changed by updating the program. The module may be a card or blade inserted into a slot of the base station device 2320. Alternatively, the module may be a chip mounted on the card or the blade. Further, the RF circuitry 2327 may include, for example, a mixer, a filter or an amplifier, and transmits and receives a wireless signal via the antenna 2310.

As shown in FIG. 12, the wireless communication interface 2325 may include multiple BB processors 2326. For example, the multiple BB processors 2326 may be compatible with multiple frequency bands used by the gNB 2300. As shown in FIG. 12, the wireless communication interface 2325 may include multiple RF circuitry 2327. For example, the multiple RF circuitry 2327 may be compatible with multiple antenna elements. Although FIG. 12 shows an example in which the wireless communication interface 2325 includes multiple BB processors 2326 and multiple RF circuitry 2327, the wireless communication interface 2325 may include a single BB processor 2326 or single RF circuitry 2327.

In the gNB 2300 shown in FIG. 12, a transceiver of a wireless communication device on a base station side according to an embodiment of the present disclosure may be implemented by the radio communication interface 2325. At least a part of functions of processing circuitry and/or units of the electronic device or wireless communication device on the base station side according to the embodiments of the present disclosure may be implemented by the controller 2321. For example, the controller 2321 may perform at least a part of functions of the processing circuitry and/or the units of the electronic device or the wireless communication device on the base station side according to the embodiments of the present disclosure by executing a program stored in the memory 2322.

In the description of specific embodiments of the present disclosure above, features described and/or illustrated for one embodiment may be used in one or more other embodiments in the same or similar manner, combined with features in other embodiments, or substitute for features in other embodiments.

It is be noted that, terms "including/comprising" used herein refer to existing of features, elements, steps or components, but existing or adding of one or more other features, elements, steps or components is not excluded.

In the above embodiments and examples, reference numerals consisting of numbers are used to indicate various steps and/or units. Those skilled in the art should understand that the reference numerals are used to facilitate describing and drawing, and are not intended to indicate an order or limit in any way.

In addition, the method according to the present disclosure is not limited to be performed in a time order described in the description, and may be performed according to other time orders, in parallel or independently. Therefore, the order in which the method described in the description is performed does not limit the technical scope of the present disclosure.

Although the present disclosure is disclosed by the description of specific embodiments of the present disclosure above, it should be understood that all the embodiments and examples described above are only schematic and are not intended to limit. For those skilled in the art, various changes, improvements or equivalents may be designed for the present disclosure within the spirit and scope of the appended claims. The changes, improvements or equivalents should be regarded as falling within the protection scope of the present disclosure.

In addition, the present disclosure further includes the following.

(1) An electronic device for wireless communication, comprising processing circuitry configured to:
obtain a collaborative equipment set of target equipment, the collaborative equipment set comprising one or more collaborative equipment; and
perform control to transmit data for the target equipment jointly to the target equipment and at least one collaborative equipment, for the at least one collaborative equipment to forward the data to the target equipment.

(2) The electronic device according to (1), wherein the processing circuitry is configured to perform the transmission of the data in response to an Ultra-Reliable Low Latency Communication URLLC request from the target equipment.

(3) The electronic device according to (1), wherein obtaining the collaborative equipment set comprises determining the collaborative equipment set based on one or more items of the following information:
a nearby-equipment list of the target equipment;
position information of the target equipment and other equipment;
quality of communication of the target equipment and other equipment with a wireless access point; and
quality of communication of the target equipment with other equipment.

(4) The electronic device according to (1), wherein obtaining the collaborative equipment set comprises receiving indication information on the collaborative equipment set from the target equipment, wherein the collaborative equipment set is determined by the target equipment based on quality of communication with other equipment.

(5) The electronic device according to (1), wherein transmitting the data comprises transmitting a packet header and a data block, the packet header containing identification information of the target equipment and the data block containing the data.

(6) The electronic device according to (5), wherein the processing circuitry is configured to: perform control to transmit the packet header and the data block through different channels.

(7) The electronic device according to (6), wherein a length of an OFDM symbol of a channel for transmitting the packet header is less than a length of an OFDM symbol of a channel for transmitting the data block.

(8) The electronic device according to any one of (1) to (7), wherein the processing circuitry is further configured to perform one or more of following operations:
upon receipt of an acknowledgement character of the target equipment for the first data, if there is second data to be transmitted to the target equipment, performing control to transmit the second data;
upon receipt of a non-acknowledgement character of the target equipment for the first data, performing control to retransmit the first data; and
upon receipt of an acknowledgement character for the first data after receipt of a non-acknowledgement character of the target equipment for the first data, stopping retransmitting the first data.

(9) A wireless communication method, comprising:
obtaining a collaborative equipment set of target equipment, the collaborative equipment set comprising one or more collaborative equipment; and
transmitting data for the target equipment jointly to the target equipment and at least one collaborative equipment, for the at least one collaborative equipment to forward the data to the target equipment.

(10) An electronic device for wireless communication, comprising processing circuitry configured to:
perform control to receive data transmission from a wireless access point, the data transmission containing identification information of target equipment and data for the target equipment; and
perform control to forward the data to the target equipment, in a case where it is determined based on the identification information that current equipment is not the target equipment.

(11) The electronic device according to (10), wherein the data transmission comprises a packet header and a data block, the packet header containing the identification information and the data block containing the data.

(12) The electronic device according to (11), wherein
the processing circuitry is configured to perform control to receive the packet header and the data block through different channels; and
a length of an OFDM symbol of a channel for receiving the packet header is less than a length of an OFDM symbol of a channel for receiving the data block.

(13) The electronic device according to (11), wherein the processing circuitry is configured to:
decode the packet header to obtain the identification information; and
forward the data block to the target equipment based on the identification information without decoding the data block.

(14) A wireless communication method, comprising:
receiving data transmission from a wireless access point, the data transmission containing identification information of target equipment and data for the target equipment; and
forwarding the data to the target equipment, in a case where it is determined based on the identification information that current equipment is not the target equipment.

(15) An electronic device for wireless communication, comprising processing circuitry configured to:
perform control to receive data transmission from a wireless access point, the data transmission containing identification information of target equipment and data for the target equipment; and
perform control to receive the data from the wireless access point that is forwarded by at least one collaborative equipment, in a case where it is determined based on the identification information that current equipment is the target equipment.

(16) The electronic device according to (15), wherein the processing circuitry is configured to: perform control to transmit an Ultra-Reliable Low Latency Communication URLLC request for the data to the wireless access point.

(17) The electronic device according to (15), wherein the processing circuitry is further configured to:
determine a collaborative equipment set, the collaborative equipment set comprising one or more collaborative equipment; and
perform control to inform the wireless access point of the determined collaborative equipment set.

(18) The electronic device according to (15), wherein the processing circuitry is configured to perform control to transmit one or more items of the following information to the wireless access point:
a nearby-equipment list of the current equipment;
position information of the current equipment;
quality of communication of the current equipment with the wireless access point; and
quality of communication of the current equipment with other equipment.

(19) The electronic device according to (15), wherein the data transmission comprises a packet header and a data block, the packet header containing identification information and the data block containing the data.

(20) The electronic device according to (19), wherein the processing circuitry is configured to perform control to receive the packet header and the data block through different channels; and
a length of an OFDM symbol of a channel for receiving the packet header is less than a length of an OFDM symbol of a channel for receiving the data block.

(21) The electronic device according to (19), wherein the processing circuitry is configured to:
decode the packet header to obtain the identification information;
decode the data block and receive data from the collaborative equipment in a case where it is determined based on the identification information that the current equipment is the target equipment; and
transmit an acknowledgement character to the wireless access point in a case where the data transmission from the wireless access point is correctly received, and transmit a non-acknowledgement character to the wireless access point in a case where the data transmission from the wireless access point is incorrectly received.

(22) The electronic device according to (21), wherein the processing circuitry is further configured to:
perform joint decoding on the data from the wireless access point and the data from the collaborative equipment after receipt of the data from the collaborative equipment; and
transmit an acknowledgement character to the wireless access point in a case where a cyclic redundancy check is successful and transmit a non-acknowledgement character to the wireless access point in a case where a cyclic redundancy check is unsuccessful.

(23) A wireless communication method, comprising:
receiving data transmission from a wireless access point, the data transmission containing identification information of target equipment and data for the target equipment; and
receiving the data from the wireless access point that is forwarded by at least one collaborative equipment, in a case where it is determined based on the identification information that current equipment is the target equipment.

(24) An electronic device for wireless communication, comprising processing circuitry configured to:
perform control to receive data transmission from target equipment, the data transmission containing identification information of a wireless access point and data for the wireless access point; and
perform control to receive data from the target equipment that is forwarded by at least one collaborative equipment.

(25) The electronic device according to (24), the processing circuitry is further configured to:
determine a collaborative equipment set for the target equipment, the collaborative equipment set comprising one or more collaborative equipment.

(26) A wireless communication method, comprising:
receiving data transmission from target equipment, the data transmission containing identification information of a wireless access point and data for the wireless access point; and
receiving the data from the target equipment that is forwarded by at least one collaborative equipment.

(27) An electronic device for wireless communication, comprising processing circuitry configured to:
perform control to receive data transmission from the target equipment, the data transmission containing identification information of a wireless access point and data for the wireless access point; and
perform control to forward the data to the wireless access point based on the identification information.

(28) A wireless communication method, comprising:
receiving data transmission from target equipment, the data transmission containing identification information of a wireless access point and data for the wireless access point; and
forwarding the data to the wireless access point based on the identification information.

(29) An electronic device for wireless communication, comprising processing circuitry configured to:

perform control to transmit data transmission to a wireless access point, the data transmission containing identification information of the wireless access point and data for the wireless access point; and perform control to transmit the data to at least one collaborative equipment, for the at least one collaborative equipment to forward the data to the wireless access point.

(30) A wireless communication method, comprising:

transmitting data transmission to a wireless access point, the data transmission containing identification information of a wireless access point and data for the wireless access point; and transmitting the data to at least one collaborative equipment, for the at least one collaborative equipment to forward the data to the wireless access point.

(31) A computer readable medium comprising executable instructions that, when executed by an information processing apparatus, cause the information processing apparatus to implement the method according to any one of (9), (14), (23), (26), (28) and (30).

The invention claimed is:

1. An electronic device for wireless communication, comprising processing circuitry configured to:
   receive from a wireless access point:
      header information via a first channel, the header information containing information that identifies a target equipment that is to receive data from the wireless access point;
      the data via a second channel different from the first channel,
   wherein the first channel comprises a first set of time-frequency resources, and the second channel comprises a second set of time-frequency resources that does not overlap with the first set of time-frequency resources,
   wherein a location of the header information in the first set of time-frequency resources corresponds to a location of the data in the second set of time-frequency resources,
   wherein the first and second channels partially overlap in time and do not overlap in frequency, and
   wherein a start time of the second channel occurs after a start time of the first channel and an end time of the second channel occurs after an end time of the first channel;
   based on the header information, determine whether or not the electronic device is the target equipment that is to receive the data;
   based on the header information indicating that the electronic device is the target equipment that is to receive data; process the data and send one of a first acknowledgement (ACK) or non-acknowledgement (NACK) to the wireless access point;
   after receiving the data from the wireless access point, receive a copy of the data from at least one collaborative equipment,
   wherein the copy of the data is received without a request from the electronic device; and
   jointly process the data and the copy of the data and, based on a cyclic redundancy code (CRC) check, send one of a second acknowledgement (ACK) or non-acknowledgement (NACK) to the wireless access point.

2. The electronic device according to claim 1, wherein the processing circuitry is configured to: perform control to transmit an Ultra-Reliable Low Latency Communication URLLC request for the data to the wireless access point.

3. The electronic device according to claim 1, wherein the processing circuitry is further configured to:
   determine a collaborative equipment set, the collaborative equipment set comprising one or more collaborative equipment; and
   perform control to inform the wireless access point of the determined collaborative equipment set.

4. The electronic device according to claim 1, wherein the processing circuitry is configured to perform control to transmit each of the following information to the wireless access point:
   a nearby-equipment list of the current equipment;
   position information of the current equipment;
   quality of communication of the current equipment with the wireless access point; and
   quality of communication of the current equipment with other equipment.

5. The electronic device according to claim 1, wherein a length of an OFDM symbol of the first channel is less than a length of an OFDM symbol of the second channel.

6. A method of wireless communication performed by an electronic device, the method comprising:
   receiving from a wireless access point:
      header information via a first channel, the header information containing information that identifies a target equipment that is to receive data from the wireless access point;
      the data via a second channel different from the first channel,
   wherein the first channel comprises a first set of time-frequency resources, and the second channel comprises a second set of time-frequency resources that does not overlap with the first set of time-frequency resources,
   wherein a location of the header information in the first set of time-frequency resources corresponds to a location of the data in the second set of time-frequency resources,
   wherein the first and second channels partially overlap in time and do not overlap in frequency, and
   wherein a start time of the second channel occurs after a start time of the first channel, and an end time of the second channel occurs after an end time of the first channel;
   based on the header information, determining whether or not the electronic device is the target equipment that is to receive the data;
   based on the header information indicating that the electronic device is the target equipment that is to receive data; processing the data and sending one of a first acknowledgement (ACK) or non-acknowledgement (NACK) to the wireless access point;
   after receiving the data from the wireless access point, receiving a copy of the data from at least one collaborative equipment,
   wherein the copy of the data is received without a request from the electronic device; and
   jointly processing the data and the copy of the data and, based on a cyclic redundancy code (CRC) check, sending one of a second acknowledgement (ACK) or non-acknowledgement (NACK) to the wireless access point.

7. A non-transitory computer product containing instructions for a method of wireless communication performed by an electronic device, the method comprising:
   receiving from a wireless access point:

header information via a first channel, the header information containing information that identifies a target equipment that is to receive data from the wireless access point;
the data via a second channel different from the first channel,
wherein the first channel comprises a first set of time-frequency resources, and the second channel comprises a second set of time-frequency resources that does not overlap with the first set of time-frequency resources,
wherein a location of the header information in the first set of time-frequency resources corresponds to a location of the data in the second set of time-frequency resources,
wherein the first and second channels partially overlap in time and do not overlap in frequency, and
wherein a start time of the second channel occurs after a start time of the first channel, and an end time of the second channel occurs after an end time of the first channel;

based on the header information, determining whether or not the electronic device is the target equipment that is to receive the data;
based on the header information indicating that the electronic device is the target equipment that is to receive data; processing the data and sending one of a first acknowledgement (ACK) or non-acknowledgement (NACK) to the wireless access point;
after receiving the data from the wireless access point, receiving a copy of the data from at least one collaborative equipment,
wherein the copy of the data is received without a request from the electronic device; and
jointly processing the data and the copy of the data and, based on a cyclic redundancy code (CRC) check, sending one of a second acknowledgement (ACK) or non-acknowledgement (NACK) to the wireless access point.

\* \* \* \* \*